United States Patent
Iijima

(10) Patent No.: US 8,361,194 B2
(45) Date of Patent: Jan. 29, 2013

(54) AIR POLLUTION CONTROL APPARATUS AND AIR POLLUTION CONTROL METHOD

(75) Inventor: Masaki Iijima, Hiroshima (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 13/474,440

(22) Filed: May 17, 2012

(65) Prior Publication Data

US 2012/0222394 A1 Sep. 6, 2012

Related U.S. Application Data

(62) Division of application No. 12/581,649, filed on Oct. 19, 2009, now Pat. No. 8,202,354.

(30) Foreign Application Priority Data

Mar. 9, 2009 (JP) ................................. 2009-055291

(51) Int. Cl.
*B01D 46/00* (2006.01)
*B01D 45/00* (2006.01)

(52) U.S. Cl. ............. 95/14; 95/31; 95/267; 96/407; 96/420; 55/413

(58) Field of Classification Search .......... 55/410, 55/413, 415, 417, 418, 437, 459.3, 461; 95/149, 95/236, 267, 272; 96/243, 257; 423/210, 423/228
See application file for complete search history.

(56) References Cited

U.S. PATENT DOCUMENTS

| | | | |
|---|---|---|---|
| 1,044,501 A | 11/1912 | Crawford | |
| 2,608,461 A | 8/1952 | Frazier | |
| 3,368,578 A | 2/1968 | Long | |
| 3,453,835 A | 7/1969 | Hochgesand | |
| 3,638,636 A | 2/1972 | Marshall et al. | |
| 3,690,636 A | 9/1972 | Shannon et al. | |
| 3,729,901 A | 5/1973 | Jackson | |
| 4,168,958 A | 9/1979 | Hartman | |
| 4,600,561 A * | 7/1986 | Frei ............................... | 422/170 |
| 5,035,188 A * | 7/1991 | Johnson et al. ............... | 110/345 |
| 5,076,818 A | 12/1991 | Jonsson | |

(Continued)

FOREIGN PATENT DOCUMENTS

| | | |
|---|---|---|
| EP | 1142621 A1 | 10/2001 |
| EP | 1695756 A1 | 8/2006 |

(Continued)

OTHER PUBLICATIONS

Chu Robert "Post Combustion CO2Removal Cost Efficient Design & Integration Study", Internet Citation, Feb. 26, 2004, www.co2captureproject.org, XP002378165.

(Continued)

*Primary Examiner* — Duane Smith
*Assistant Examiner* — Christopher P Jones
(74) *Attorney, Agent, or Firm* — Westerman, Hattori, Daniels & Adrian, LLP

(57) ABSTRACT

An air pollution control apparatus according to an embodiment of the present invention includes: a stack that discharges flue gas discharged from a boiler outside; a blower that is provided downstream of the stack and draws in the flue gas; and a $CO_2$ recovering apparatus that recovers $CO_2$ in the flue gas drawn in by the blower. The stack includes a controlling unit that suppresses release of the flue gas outside from the stack and suppresses inflow of atmosphere to the stack, and the controlling unit is a channel forming unit that forms a serpentine channel through which the flue gas and the atmosphere in the stack flow.

5 Claims, 5 Drawing Sheets

U.S. PATENT DOCUMENTS

| | | | |
|---|---|---|---|
| 5,318,758 | A | 6/1994 | Fuji et al. |
| 5,378,442 | A | 1/1995 | Fuji et al. |
| 5,403,563 | A * | 4/1995 | Crosbie et al. ............... 422/261 |
| 6,383,462 | B1 * | 5/2002 | Lang ............................. 423/235 |
| 6,399,030 | B1 | 6/2002 | Nolan |
| 6,784,320 | B2 | 8/2004 | Mimura et al. |
| 7,316,737 | B2 | 1/2008 | Mimura et al. |
| 2008/0056972 | A1 | 3/2008 | Iijima |
| 2009/0252659 | A1 | 10/2009 | Iijima et al. |
| 2010/0266472 | A1 | 10/2010 | Peng |
| 2012/0234177 | A1 | 9/2012 | Yonekawa |

FOREIGN PATENT DOCUMENTS

| | | |
|---|---|---|
| GB | 1104013 A | 2/1968 |
| JP | 07-305829 A | 11/1995 |
| JP | 2008-062165 A | 3/2008 |
| WO | 2004/048852 A1 | 6/2004 |
| WO | 2008/156084 A1 | 12/2008 |

OTHER PUBLICATIONS

Partial European Search Report dated Apr. 14, 2011, issued in corresponding European Patent Applcation No. 09174653.

Canadian Office Action dated Aug. 17, 2011, issued in corresponding Canadien Patent Application No. 2,683,380.

Notice of Allowance dated Nov. 5, 2012, issued in corresponding U.S. Appl. No. 13/474,460.

Notice of Allowance dated Oct. 26, 2012, issued in corresponding U.S. Appl. No. 13/474,450.

* cited by examiner

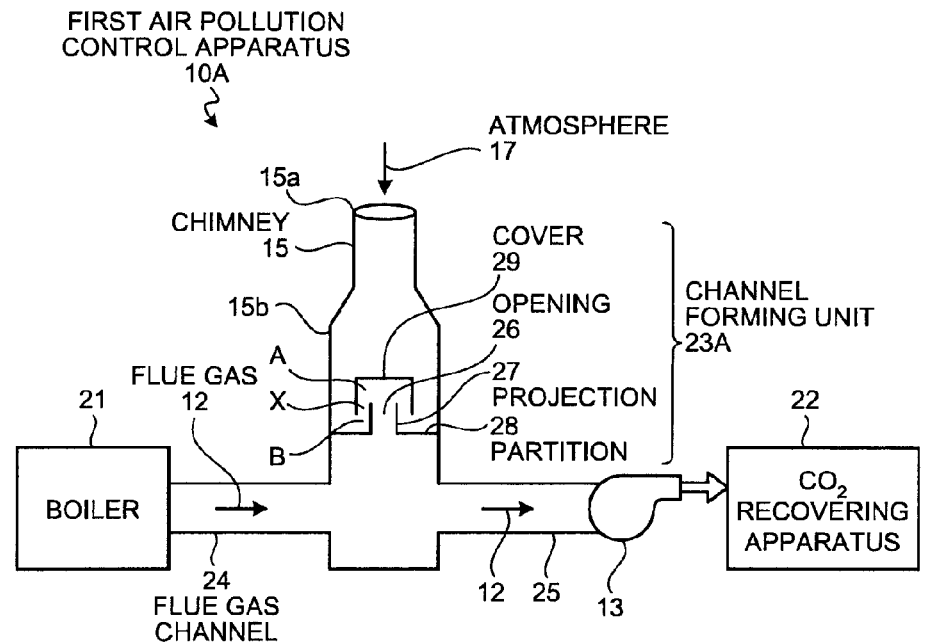
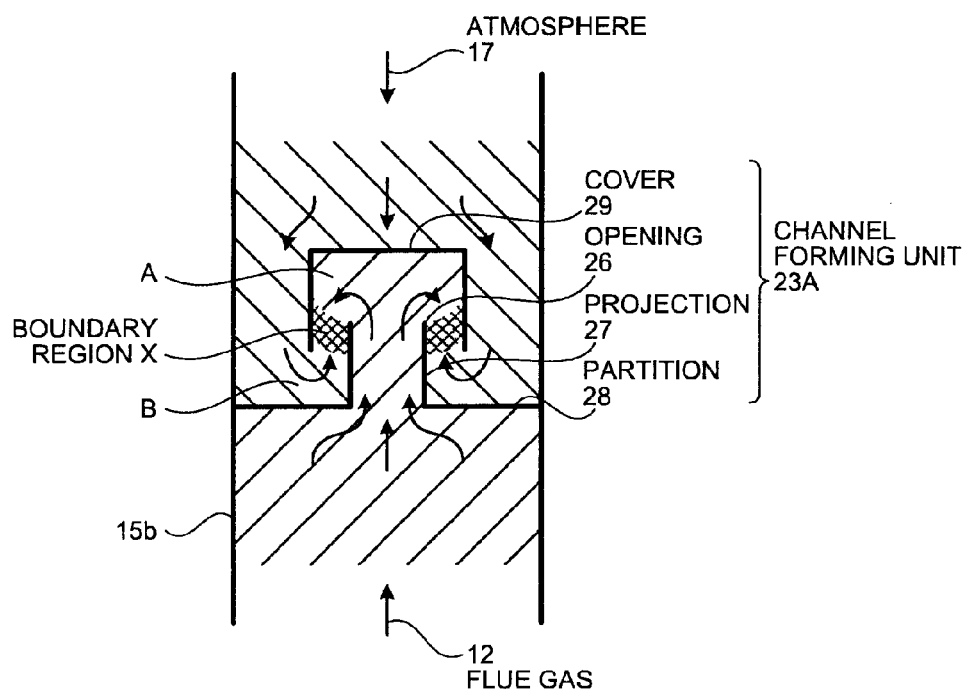

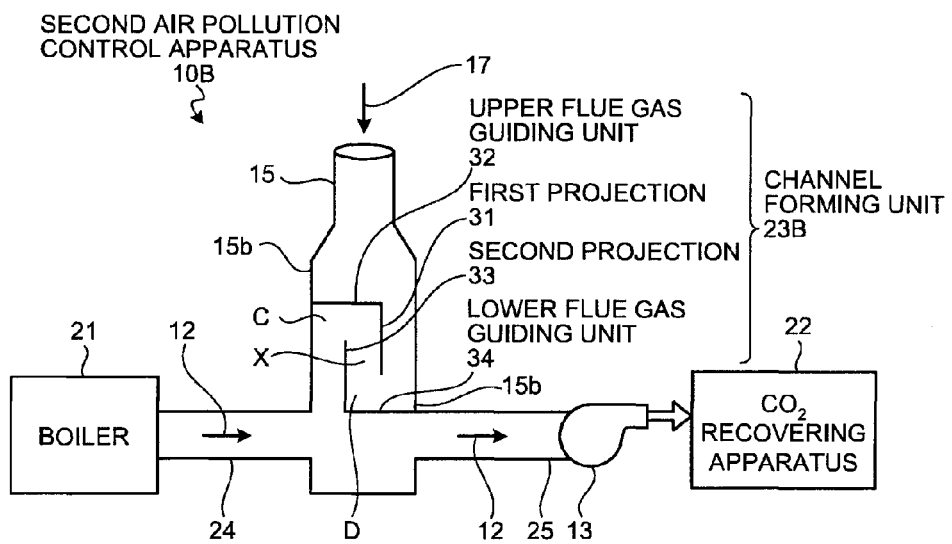
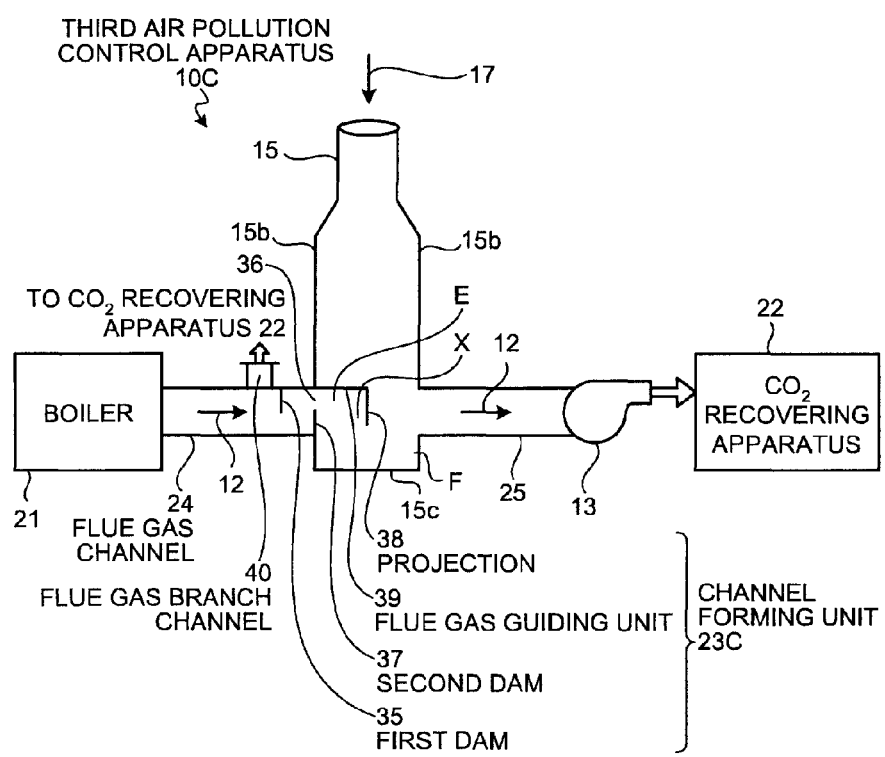

US 8,361,194 B2

AIR POLLUTION CONTROL APPARATUS AND AIR POLLUTION CONTROL METHOD

CROSS-REFERENCE TO RELATED APPLICATIONS

This application is a divisional of U.S. patent application Ser. No. 12/581,649, filed Oct. 19, 2009, now U.S. Pat. No. 8,202,354 B2, which in turn is based on and claims priority of Japanese Patent Application No. JP2009-055291, filed Mar. 9, 2009, the entirety of each of which is incorporated herein by reference.

BACKGROUND OF THE INVENTION

1. Field of the Invention

The present invention relates to an air pollution control apparatus and an air pollution control method that suppress discharge, to the atmosphere, of flue gas discharged from a boiler and the like.

2. Description of the Related Art

Recently, the greenhouse effect of $CO_2$ has been pointed out as a cause of global warming, and a countermeasure against it has become an international urgent task for protecting the global environment. The source of $CO_2$ ranges over every kind of human activities involving burning of fossil fuels, and the trend is toward further demand for the suppression of $CO_2$ discharge. Along with the trend, a method of bringing burnt flue gas from a boiler into contact with amine $CO_2$ absorbing solution and reducing and recovering $CO_2$ in the burnt flue gas, and a method of preserving recovered $CO_2$ without releasing it to the atmosphere have been strenuously studied for use at a power generating facility such as a thermal power plant that uses a large amount of fossil fuels (see, for example, Japanese Patent Application Laid-open No. 2008-62165).

However, no conventional techniques draw the total amount of flue gas from a boiler, a gas turbine, or the like to be discharged from a stack to the atmosphere into a $CO_2$ recovering apparatus. In recovering $CO_2$, it have been demanded to maximize an amount of flue gas drawn in, and not to draw in the atmosphere.

For example, while a fuel gas desulfurization apparatus is generally provided downstream of a boiler for reducing sulfur oxide in flue gas discharged from the boiler, it is proposed to provide a damper or the like that can be opened and closed as a blocking unit in a stack provided upstream of the fuel gas desulfurization apparatus. A schematic of a configuration of a conventional fuel gas treatment facility is shown in FIG. 9. As shown in FIG. 9, in this conventional fuel gas treatment facility 100 in which a desulfurization apparatus is installed as an air pollution control apparatus together with a boiler, the total amount of flue gas 12 discharged from a boiler 11 that is a burning device in, for example, a thermal power plant, is drawn by a blower 13, and $So_x$ in the flue gas 12 is reduced for example by a fuel gas desulfurization apparatus 14. A discharge opening is blocked by providing a damper 16 or the like that can be opened and closed as a blocking unit in a stack 15 so that sulfur oxide is not discharged to the atmosphere. The damper 16 is closed when the fuel gas desulfurization apparatus 14 is operated, and the damper 16 is opened when a flue gas source is running, while the operation performed by the fuel gas desulfurization apparatus 14 is stopped.

However, as shown in FIG. 9, when a blocking unit such as the damper 16 that can be opened and closed is provided in the stack 15, an industrial facility (a gas turbine or the like) provided upstream such as the boiler 11 and a turbine is adversely influenced when the damper 16 is closed while the facility provided upstream such as the boiler 11 and a gas turbine is being operated.

Furthermore, when a blocking unit such as the damper 16 is not provided, as shown in FIG. 10, when the operation performed by the $CO_2$ recovering apparatus, the fuel gas desulfurization apparatus 14, or the like is stopped for example, and the flow rate of flue gas in the stack 15 becomes low, the flue gas 12 having high temperature flows out from a central portion of the inside of the stack 15, and the atmosphere 17 flows in along the inner wall of the stack 15. Thus, the atmosphere 17 flows into the stack 15.

In the case of the stack 15 having a short height, and the stack 15 having a large inner diameter, the flue gas 12 is more prone to flow out from the stack 15, and the atmosphere 17 is more prone to flow into the stack 15.

Accordingly, an appearance of an apparatus has been desired that draws the almost total amount of a large amount of flue gas into a $CO_2$ recovering apparatus, and does not discharge the flue gas to the atmosphere safely and stably even when the operation performed by the $CO_2$ recovering apparatus, the fuel gas desulfurization apparatus, or the like is stopped for example, with a simple structure without providing a blocking unit such as a damper in the stack.

In view of the problems, an object of the present invention is to provide an air pollution control apparatus and an air pollution controls method that can draw, into a $CO_2$ recovering apparatus, almost all amount of flue gas discharged from a stack to the atmosphere stably and safely, and minimizes draw-in of the atmosphere with a simple structure.

SUMMARY OF THE INVENTION

According to an aspect of the present invention, an air pollution control apparatus includes: a stack that discharges flue gas, discharged from an industrial facility, outside; a blower that is provided downstream of the stack and draws in the flue gas; and a $CO_2$ recovering apparatus that recovers $CO_2$ in the flue gas drawn in by the blower. The stack includes a controlling unit that suppresses release of the flue gas outside from the stack and suppresses inflow of atmosphere to the stack, and the controlling unit is a channel forming unit that forms a serpentine channel through which the flue gas and the atmosphere in the stack flow.

Advantageously, in the air pollution control apparatus, the channel forming unit includes: a partition including a portion defining an opening formed at a central portion of the stack in a cross-sectional direction in a longitudinal direction and a projection that projects to a tower head of the stack; and a hood-like cover provided to face the partition with a given gap therebetween.

Advantageously, in the air pollution control apparatus, the channel forming unit includes: an upper flue gas guiding unit extending from a wall surface of the stack on a side in which the flue gas flows when viewed from a cross-sectional direction of a longitudinal direction of the stack, and including, at a leading end thereof, a first projection that projects downward; and a lower flue gas guiding unit extending from a wall surface of the stack on a side from which the flue gas is discharged, and including, at a leading end thereof, a second projection that projects upward, and the second projection of the lower flue gas guiding unit is provided between the wall surface of the stack and the first projection of the upper flue gas guiding unit so that a channel for the flue gas is formed in the stack.

Advantageously, in the air pollution control apparatus, the channel forming unit includes: a first dam provided at an upper portion of a flue gas channel through which the flue gas is fed from the industrial facility to the stack when viewed from a cross-sectional direction in a longitudinal direction of the stack; a second dam provided at a lower portion of an inlet of the stack through which the flue gas is fed to the stack; and a flue gas guiding unit extending from a wall surface of the stack on which the inlet is formed, and including, at a leading end thereof, a projection that projects downward.

According to another aspect of the present invention, an air pollution control apparatus includes: a stack that discharges flue gas, discharged from an industrial facility, outside; a blower that is provided downstream of the stack and draws in the flue gas; and a $CO_2$ recovering apparatus that recovers $CO_2$ in the flue gas drawn in by the blower. The stack includes a controlling unit that suppresses release of the flue gas outside from the stack and suppresses inflow of atmosphere to the stack, and the controlling unit is a mixing unit that mixes the flue gas and the atmosphere.

Advantageously, the air pollution control apparatus further includes a flue gas return flow channel that returns, into the stack, a part of the flue gas fed to the $CO_2$ recovering apparatus by the blower.

According to still another aspect of the present invention, an air pollution control apparatus includes: a stack that discharges flue gas, discharged from an industrial facility, outside; a blower that is provided downstream of the stack and draws in the flue gas; and a $CO_2$ recovering apparatus that recovers $CO_2$ in the flue gas drawn in by the blower. The stack includes a controlling unit that suppresses release of the flue gas outside from the stack and suppresses inflow of atmosphere to the stack, and the controlling unit is a leak suppressing unit that suppresses inflow of the atmosphere to the stack.

Advantageously, in the air pollution control apparatus, the leak suppressing unit is at least one resistive part that is provided on a wall surface of the stack, and extends toward an exit of the stack when viewed from a cross-sectional direction in a longitudinal direction of the stack.

According to still another aspect of the present invention, an air pollution control apparatus includes: a stack that discharges flue gas, discharged from an industrial facility, outside; a blower that is provided downstream of the stack and draws in the flue gas; and a $CO_2$ recovering apparatus that recovers $CO_2$ in the flue gas drawn in by the blower. The stack includes a controlling unit that suppresses release of the flue gas outside from the stack and suppresses inflow of atmosphere to the stack, and the controlling unit is an opening/closing unit that is provided at an inlet of the stack through which the flue gas is fed into the stack and that is openable only inward of the stack.

According to still another aspect of the present invention, an air pollution control method including using a density difference between flue gas discharged from an industrial facility and atmosphere flowing in from outside of a stack, the density difference being caused by a temperature difference therebetween, to prevent the flue gas from flowing outside.

According to still another aspect of the present invention, an air pollution control method includes mixing flue gas discharged from an industrial facility and atmosphere flowing in from outside of a stack to prevent the atmosphere from flowing further inside of the stack.

According to still another aspect of the present invention, an air pollution control method using the air pollution control apparatus described above to prevent the flue gas from flowing outside of the stack.

BRIEF DESCRIPTION OF THE DRAWINGS

FIG. 1 is a schematic of a configuration of an air pollution control apparatus according to a first embodiment of the present invention;

FIG. 2 is a partially enlarged schematic of a configuration of the inside of a stack;

FIG. 3 is a schematic of a configuration of an air pollution control apparatus according to a second embodiment of the present invention;

FIG. 4 is a schematic of a configuration of an air pollution control apparatus according to a third embodiment of the present invention;

DETAILED DESCRIPTION OF THE PREFERRED EMBODIMENTS

Exemplary embodiments of the present invention are explained in detail with reference to the figures. The present invention is not limited by the embodiments. Components in the embodiments include those that can be conceived of easily by a person skilled in the art, those that are substantially the same, and those that are equivalent to the components.

First Embodiment

An air pollution control apparatus according to an embodiment of the present invention is explained with reference to FIG. 1.

Figure 9:
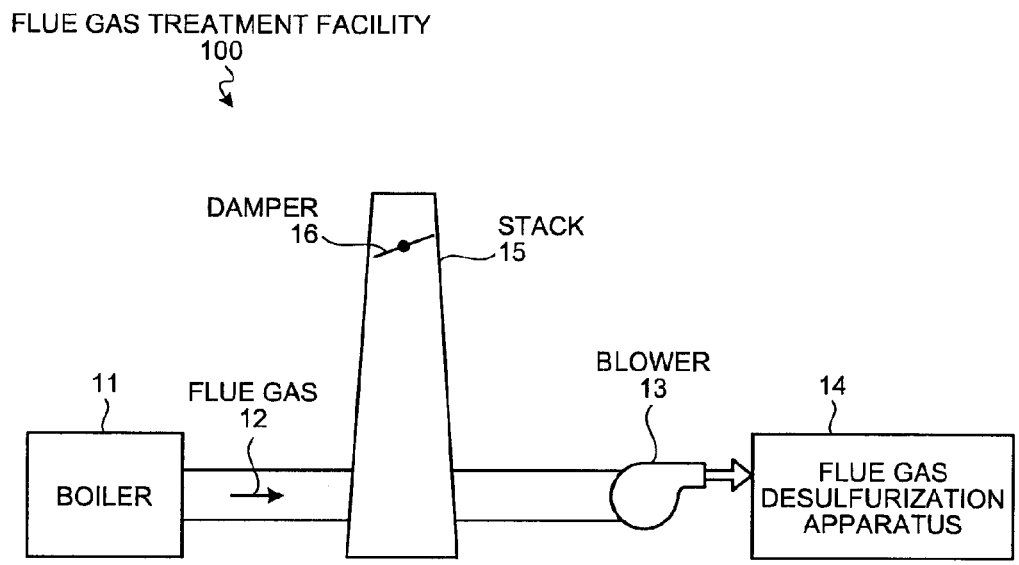
FIG. 9 is a schematic of an exemplary configuration of a conventional fuel gas treatment facility.
Figure 10:
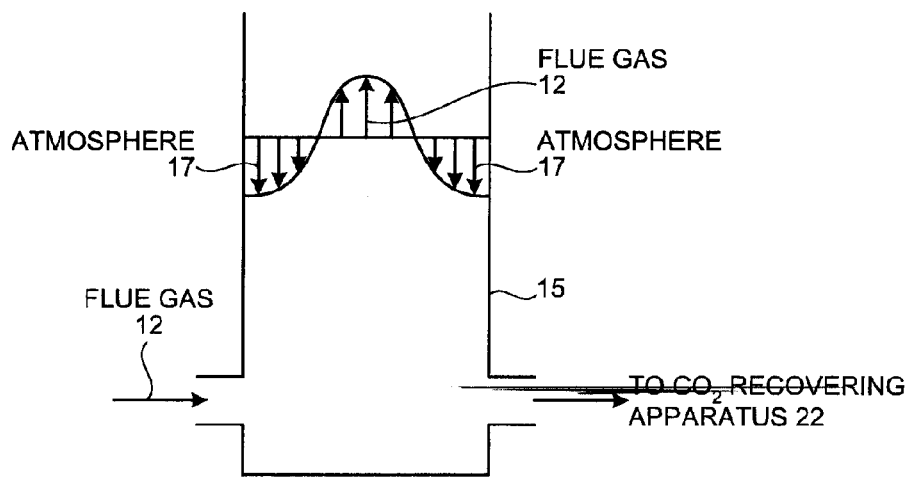
FIG. 10 is a schematic of flow of flue gas and atmosphere in a stack.

FIG. 1 is a schematic of a configuration of this air pollution control apparatus according to a first embodiment of the present invention. FIG. 2 is a partially enlarged schematic of a configuration of the inside of a stack. In FIGS. 1 and 2, components that are the same as their counterparts shown in FIG. 9 are provided with the same symbols, and are not explained repeatedly.

As shown in FIG. 1, a first air pollution control apparatus 10A according to the first embodiment of the present invention includes: a stack 15 that discharges, to the outside, flue gas 12 discharged from a boiler 21, a gas turbine, or the like provided in an industrial facility; a blower 13 that is provided downstream of the stack 15, and draws in the flue gas 12; and a $CO_2$ recovering apparatus 22 that recovers $CO_2$ in the flue gas 12 drawn in by the blower 13. The first air pollution control apparatus 10A additionally includes, in the stack 15, a controlling unit that suppresses release of the flue gas 12 from the stack 15 to the outside, and suppresses inflow of atmosphere 17 to the stack 15. As the controlling unit, a channel forming unit 23A that forms a serpentine channel through which the flue gas 12 and the atmosphere 17 flow is provided in the stack 15.

The flue gas 12 containing $CO_2$ discharged from the boiler 21, the gas turbine, or the like provided in an industrial facility is fed to the stack 15 through a flue gas channel 24 through which the flue gas 12 is fed from the boiler 21 to the stack 15, is pressurized by the blower 13, is discharged from the stack 15, and is fed to the $CO_2$ recovering apparatus 22 through the flue gas discharge channel 25.

In the present embodiment, the channel forming unit 23A used as the controlling unit includes a partition 28 including an opening 26 formed at a central portion of the stack 15 in the cross-sectional direction in the longitudinal direction, and a projection 27 that projects to a tower head 15a of the stack 15, and a hood-like cover 29 provided to face the partition 28 with a given gap therebetween.

When the operation performed by an apparatus such as the boiler 21 and the $CO_2$ recovering apparatus 22 is stopped for example, the flue gas 12 that has flowed into the stack 15 is partly fed to the $CO_2$ recovering apparatus 22 through the flue gas discharge channel 25, while the rest ascends the stack 15, passes the opening 26 of the partition 28 formed by the projection 27, and reaches a space A in the cover 29. Meanwhile, the atmosphere 17 that has flowed in to the stack 15 from the outside is fed to a space B formed by an inner wall 15b of the stack 15, the projection 27, and the partition 28. The temperature of the flue gas 12 is about 100 to 180° C., and the temperature of the atmosphere 17 is about 0 to 30° C. Because the temperature of the flue gas 12 is higher than the temperature of the atmosphere 17, the density of the flue gas 12 is smaller than the density of the atmosphere 17. Accordingly, when the flue gas 12 and the atmosphere 17 come into contact with each other, the flue gas 12 becomes buoyant, and stays higher than the atmosphere 17, and as shown in FIG. 2, a boundary region X is formed between the flue gas 12 and the atmosphere 17 due to the interaction of the temperature difference and the density difference between the flue gas 12 and the atmosphere 17.

Accordingly, due to the density difference of the flue gas 12 and the atmosphere 17 generated by the temperature difference of the flue gas 12 and the atmosphere 17, the atmosphere 17 that has flowed into the space B prevents the flue gas 12 fed to the space A from traveling. Thus, the flue gas 12 can be kept in the space A. The flue gas 12 that has flowed into the space A also prevents the atmosphere 17 that has flowed into the space B from traveling. Thus, the atmosphere 17 can be kept in the space B. Because the flue gas 12 fed into the stack 15 is sealed by the atmosphere 17 at the boundary region X between the flue gas 12 and the atmosphere 17 formed by the interaction of the temperature difference and the density difference between the flue gas 12 and the atmosphere 17, the flue gas 12 can be prevented from being discharged to the outside of the stack 15. Accordingly, when the operation performed by the $CO_2$ recovering apparatus 22 or the like is stopped for example, the atmosphere 17 can be prevented from flowing into the stack 15 without controlling opening and closing of the stack by providing a blocking unit such as a damper as in the conventional technique.

Therefore, in the first air pollution control apparatus 10A according to the first embodiment, even when the operation performed by an apparatus such as the $CO_2$ recovering apparatus 22 is stopped for example, the almost total amount of the flue gas 12 otherwise discharged from the stack 15 to the outside can be drawn into the $CO_2$ recovering apparatus 22 stably and safely with a simple structure, and draw-in of the atmosphere 17 to the $CO_2$ recovering apparatus 22 or the like can be suppressed.

Accordingly, $CO_2$ recovery rate of the $CO_2$ recovering apparatus 22 can be increased safely at any time without an adverse influence on an upstream facility, and $CO_2$ recovery performance of the $CO_2$ recovering apparatus 22 can be kept high because $CO_2$ in the flue gas 12 is not diluted by the atmosphere 17. Because the stack 15, a duct, or the like is not cooled by draw-in of the atmosphere 17 to the $CO_2$ recovering apparatus 22 or the like, generation of corrosion can be suppressed. Furthermore, a damage to an industrial facility such as the boiler 21 and a gas turbine provided upstream of the stack 15 can be prevented.

Second Embodiment

FIG. 3 is a schematic of a configuration of an air pollution control apparatus according to a second embodiment of the present invention. The air pollution control apparatus according to the present embodiment is explained with reference to FIG. 3. Components that are the same as the counterparts in the air pollution control apparatus according to the first embodiment are provided with the same symbols, and are not explained repeatedly.

In this second air pollution control apparatus 10B according to the present embodiment, a channel forming unit 23B used as a controlling unit includes: an upper flue gas guiding unit 32 extending from the wall surface 15b of the stack 15 on the side in which the flue gas 12 flows when viewed from the cross-sectional direction in the longitudinal direction of the stack 15 and including, at its leading end, a first projection 31 that projects downward; and a lower flue gas guiding unit 34 extending from the inner wall 15b of the stack 15 on the side in which the flue gas 12 flows and including, at its leading end, a second projection 33 that projects upward. The second projection 33 of the lower flue gas guiding unit 34 is provided between the inner wall 15b of the stack 15 and the first projection 31 of the upper flue gas guiding unit 32, so that a channel for the flue gas 12 is formed in the stack 15.

The flue gas 12 discharged from the boiler 21 and fed to the flue gas channel 24 passes through the stack 15, and is fed to the $CO_2$ recovering apparatus 22 through the flue gas discharge channel 25. When the operation performed by an apparatus such as the boiler 21 and the $CO_2$ recovering apparatus 22 is stopped for example, the flue gas 12 that has flowed into the stack 15 is partly fed to the $CO_2$ recovering apparatus 22 through the flue gas discharge channel 25, while the rest ascends the space formed by the inner wall 15b and the second projection 33, and is fed to a space C formed by the inner wall 15b, the upper flue gas guiding unit 32, and the first projection 31. Meanwhile, the atmosphere 17 that has flowed into the stack 15 descends the space formed by the inner wall 15b and the first projection 31, and is fed to a space D formed by the inner wall 15b, the lower flue gas guiding unit 34, and the second projection 33.

Because the temperature of the flue gas 12 is higher than the temperature of the atmosphere 17, when the flue gas 12 in the space C and the atmosphere 17 in the space D come into contact with each other, the flue gas 12 becomes buoyant due to the density difference between the flue gas 12 and the atmosphere 17 caused by the temperature difference between the flue gas 12 and the atmosphere 17, and stays higher than the atmosphere 17. The boundary region X between the flue gas 12 and the atmosphere 17 is formed by the interaction of the temperature difference and the density difference between the flue gas 12 and the atmosphere 17. Accordingly, the atmosphere 17 in the space D prevents the flue gas 12 in the space C from traveling. Thus, the flue gas 12 can be kept in the space C. Meanwhile, because the flue gas 12 kept in the space C prevents the atmosphere 17 from traveling, the atmosphere 17 can be kept in the space D.

Accordingly, because the flue gas 12 that has flowed into the stack 15 is sealed by the atmosphere 17 at the boundary X formed by the flue gas 12 and the atmosphere 17 due to the interaction of the temperature difference and the density difference between the flue gas 12 and the atmosphere 17, the flue gas 12 can be prevented from being discharged to the outside of the stack 15.

Although, in the air pollution control apparatus 10B according to the present embodiment, only the channel forming unit 23B is provided in the channel 15 as a channel forming unit, the present invention is not limited to this configuration, and the channel forming unit 23A of the first air pollution control apparatus 10A according to the first embodiment shown in FIG. 1 may be used in combination.

Third Embodiment

FIG. 4 is a schematic of a configuration of an air pollution control apparatus according to a third embodiment of the present invention. The air pollution control apparatus according to the present embodiment is explained with reference to FIG. 4. Components that are the same as the counterparts in the air pollution control apparatus according to the first embodiment are provided with the same symbols, and are not explained repeatedly.

In this third air pollution control apparatus 10C according to the present embodiment, a channel forming unit 23C used as a controlling unit includes a first dam 35 provided at the upper portion of the flue gas channel 24 through which the flue gas 12 is fed from the boiler 21 to the stack 15 when viewed from the cross-sectional direction in the longitudinal direction of the stack 15, a second dam 37 provided at the lower portion of an inlet 36 of the stack 15 through which the flue gas 12 is fed to the stack 15, and a flue gas guiding unit 39 extending from the inner wall 15b of the stack 15 on the side on which the inlet 36 is formed, and including, at its leading end, a projection 38 that projects downward.

The flue gas 12 discharged from the boiler 21 is fed into a space E formed by the first dam 35, the flue gas guiding unit 39, and the projection 38, and is fed to the $CO_2$ recovering apparatus 22 through the flue gas discharge channel 25. When the operation performed by an apparatus such as the boiler 21 and the $CO_2$ recovering apparatus 22 is stopped for example, the flue gas 12 fed from the flue gas channel 24 is fed to the space E. Meanwhile, the atmosphere 17 flows into the stack 15, descends the space formed by the inner wall 15b and the projection 38, and is fed to a space F formed by the inner wall 15b, the second dam 37, and a bottom 15c of the stack 15.

Because the temperature of the flue gas 12 fed from the flue gas channel 24 is higher than the temperature of the atmosphere 17, when the flue gas 12 in the space E and the atmosphere 17 in the space F come into contact with each other, the flue gas 12 stays higher than the atmosphere 17 due to the density difference between flue gas 12 and the atmosphere 17 caused by the temperature difference between the flue gas 12 and the atmosphere 17. The boundary region X between the flue gas 12 and the atmosphere 17 is formed by the interaction of the temperature difference and the density difference between the flue gas 12 and the atmosphere 17.

Accordingly, because the atmosphere 17 in the space F prevents the flue gas 12 in the space E from traveling, the flue gas 12 can be kept in the space E, and because the flue gas 12 kept in the space E prevents the atmosphere 17 from traveling, the atmosphere 17 can be kept in the space F. Therefore, because the flue gas 12 fed into the stack 15 is sealed by the atmosphere 17 in the space F at the boundary region X between the flue gas 12 and the atmosphere 17 formed by the interaction of the temperature difference and the density difference between the flue gas 12 and the atmosphere 17, the flue gas 12 can be prevented from being discharged to the outside of the stack 15.

Alternatively, a flue gas branch channel 40 through which the flue gas 12 is fed to the $CO_2$ recovering apparatus 22 may be provided in the flue gas channel 24. When the operation performed by the boiler 21, a turbine, or the like provided in an industrial facility is stopped, the flue gas 12 remaining in the flue gas channel 24 and the flue gas 12 in the space E can be led out of the flue gas branch channel 40, and fed to the $CO_2$ recovering apparatus 22.

Although, in the third air pollution control apparatus 10C according to the present embodiment, the first dam 35 is provided at the upper portion of the flue gas channel 24, the dam 35 may not be provided because it is necessary only to keep the flue gas 12 in the region of the space E formed by the projection 38 and the flue gas guiding unit 39 and make the flue gas 12 stay higher than the atmosphere 17 to seal the flue gas 12.

Although in the third air pollution control apparatus 10C according to the present embodiment, only the channel forming unit 23C is provided in the stack 15 as a channel forming unit, the present invention is not limited to this configuration, and any one of the channel forming unit 23A of the first air pollution control apparatus 10A according to the first embodiment shown in FIG. 1, and the channel forming unit 23B of the second air pollution control apparatus 10B according to the second embodiment shown in FIG. 3 or both may be used in combination.

Fourth Embodiment

Figure 5:
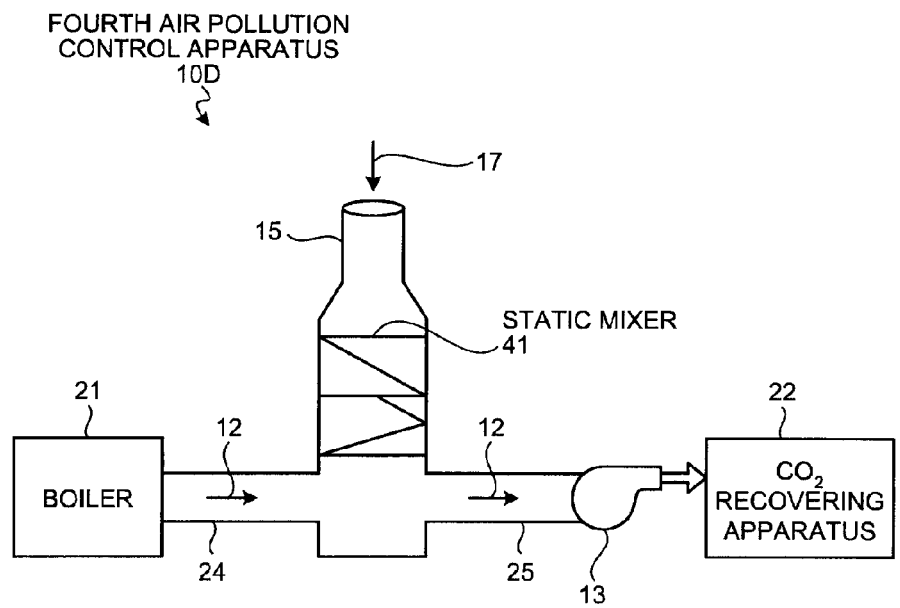
FIG. 5 is a schematic of a configuration of an air pollution control apparatus according to a fourth embodiment of the present invention.

FIG. 5 is a schematic of a configuration of an air pollution control apparatus according to a fourth embodiment of the present invention. The air pollution control apparatus according to the present embodiment is explained with reference to FIG. 5. Components that are the same as the counterparts in the air pollution control apparatus according to the first embodiment are provided with the same symbols, and are not explained repeatedly.

This fourth air pollution control apparatus 10D according to the present embodiment uses a static mixer (a mixing unit) 41 as a controlling unit that mixes the flue gas 12 and the atmosphere 17. By providing the static mixer 41 in the stack 15, the flue gas 12 and the atmosphere 17 are mixed by the static mixer 41 when the atmosphere 17 flows into the stack 15, thereby stopping the flow of the flue gas 12 and the atmosphere 17. Thus, inflow of the atmosphere 17 to the stack 15 can be decreased. Furthermore, the flue gas 12 or the atmosphere 17 can be prevented from being discharged solely from the stack 15. Even when the operation performed by an apparatus such as the $CO_2$ recovering apparatus 22 is stopped for example, inflow of the atmosphere 17 to the stack 15 can be decreased, the almost total amount of the flue gas 12 otherwise discharged from the stack 15 to the outside can be drawn into the $CO_2$ recovering apparatus 22 stably and safely with a simple structure, and draw-in of the atmosphere 17 to the $CO_2$ recovering apparatus 22 or the like can be suppressed.

Figure 6:
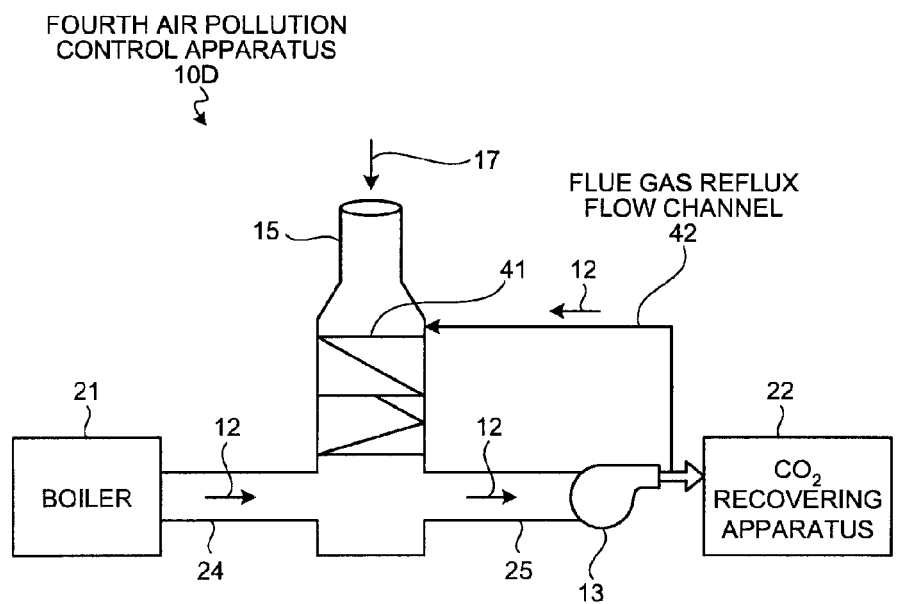
FIG. 6 is a schematic of another configuration of the air pollution control apparatus according to the fourth embodiment of the present invention.

Alternatively, in the fourth air pollution control apparatus 10D according to the present embodiment, a flue gas return flow channel 42 that returns, into the stack 15, a part of the flue gas 12 fed by the blower 13 to the $CO_2$ recovering apparatus 22 may be provided as shown in FIG. 6. By returning a part of the flue gas 12 into the stack 15 through the flue gas return flow channel 42, the atmosphere 17 is less prone to flow into the stack 15 from the outside of the stack 15. Thus, inflow of the atmosphere 17 to the stack 15 can be further decreased.

Although a spiral member like the static mixer 41 is used as a mixing unit in the fourth air pollution control apparatus 10D according to the present embodiment, the present invention is not limited to the configuration, and any spiral member that can mix the flue gas 12 and the atmosphere 17 may be used. Alternatively, any non-spiral member that can mix the flue gas 12 and the atmosphere 17 may be used.

Although only the static mixer 41 is provided in the stack 15 as a mixing unit in the fourth air pollution control apparatus 10D according to the present embodiment, the present invention is not limited to the configuration, and at least any one of the channel forming unit 23A of the first air pollution control apparatus 10A according to the first embodiment shown in FIG. 1, the channel forming unit 23B of the second air pollution control apparatus 10B according to the second embodiment shown in FIG. 3, and the channel forming unit 23C of the third air pollution control apparatus 10C according to the third embodiment shown in FIG. 4 may be used in combination.

Fifth Embodiment

Figure 7:
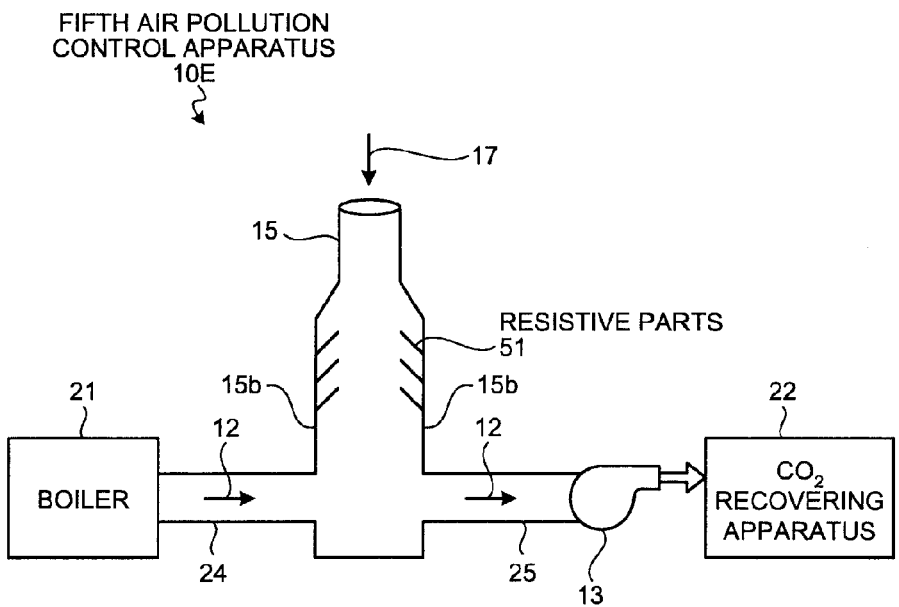
FIG. 7 is a schematic of a configuration of an air pollution control apparatus according to a fifth embodiment of the present invention.

FIG. 7 is a schematic of a configuration of an air pollution control apparatus according to a fifth embodiment of the present invention. The air pollution control apparatus according to the present embodiment is explained with reference to FIG. 7. Components that are the same as the counterparts in the air pollution control apparatus according to the first embodiment are provided with the same symbols, and are not explained repeatedly.

This fifth air pollution control apparatus 10E according to the present embodiment uses a leak suppressing unit as a controlling unit that suppresses inflow of the atmosphere 17 to the stack 15. In the present embodiment, three resistive parts 51 extending to the exit of the stack 15 when viewed from the cross-sectional direction in the longitudinal direction of the stack 15 are provided as the leak suppressing unit at the inner wall 15b of the stack 15. The resistive parts 51 are provided along the inner wall 15b of the stack 15.

Because the temperature of the atmosphere 17 is lower than the temperature of the flue gas 12, the flow rate of the atmosphere 17 that has flowed into the stack 15 descending along the inner wall of the stack 15 is larger than the flow rate of the atmosphere 17 descending at the central portion of the stack 15. Accordingly, by providing the resistive parts 51 at the inner wall 15b of the stack 15, the inflow rate of the atmosphere 17 descending along the inner wall of the stack 15 can be suppressed. Furthermore, inflow of the atmosphere 17 descending at the central portion of the stack 15 to the stack 15 can be decreased due to the flue gas 12 fed into the stack 15 and ascending the stack 15. Even when the operation performed by an apparatus such as the $CO_2$ recovering apparatus 22 is stopped for example, the inflow rate of the atmosphere 17 to the stack 15 can be decreased, the almost total amount of the flue gas 12 otherwise discharged from the stack 15 to the outside can be drawn into the $CO_2$ recovering apparatus 22 stably and safely with a simple structure, and draw-in of the atmosphere 17 to the $CO_2$ recovering apparatus 22 or the like can be suppressed.

Although the number of the resistive parts 51 provided are three in the fifth air pollution control apparatus 10E according to the present embodiment, the number of the resistive parts 51 may be changed appropriately according to the suppression rate of the atmosphere 17.

Although the resistive part extending to the exit of the stack 15 when viewed from the cross-sectional direction in the longitudinal direction of the stack 15 is employed in the fifth air pollution control apparatus 10E according to the present embodiment, the present invention is not limited to this configuration, and any member that can suppress inflow of the atmosphere 17 to the stack 15 may be employed.

Further, although only the leak suppressing unit for suppressing inflow of the atmosphere 17 to the stack 15 is provided in the stack 15 as a controlling unit in the fifth air pollution control apparatus 10E according to the present embodiment, the present invention is not limited to this configuration. For example, at least any one of the channel forming unit 23A of the first air pollution control apparatus 10A according to the first embodiment shown in FIG. 1, the channel forming unit 23B of the second air pollution control apparatus 10B according to the second embodiment shown in FIG. 3, the channel forming unit 23C of the third air pollution control apparatus 10C according to the third embodiment shown in FIG. 4, and the mixing unit 41 of the fourth air pollution control apparatus 10D according to the fourth embodiment shown in FIG. 5 may be used in combination.

Sixth Embodiment

Figure 8:
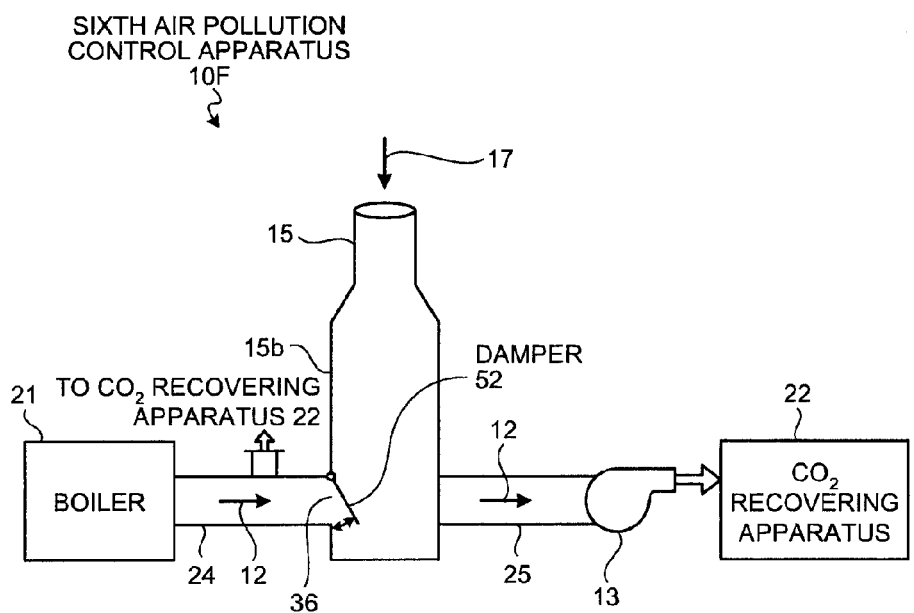
FIG. 8 is a schematic of a configuration of an air pollution control apparatus according to a sixth embodiment of the present invention.

FIG. 8 is a schematic of a configuration of an air pollution control apparatus according to a sixth embodiment of the present invention. The air pollution control apparatus according to the present embodiment is explained with reference to FIG. 8. Components that are the same as the counterparts in the air pollution control apparatus according to the first embodiment are provided with the same symbols, and are not explained repeatedly.

A sixth air pollution control apparatus 10F according to the present embodiment uses a dumper (an opening/closing unit) 52 as a controlling unit that is provided at the inlet 36 of the stack 15 through which the flue gas 12 is fed into the stack 15 and that can be opened only inward of the stack 15.

The dumper 52 is openable only inward of the stack 15 about one end of the inlet 36. Accordingly, by providing the dumper 52 at the inlet 36 of the inner wall 15b, when the $CO_2$ recovering apparatus 22 is running and the blower 13 is drawing in the flue gas 12, or when an industrial facility such as the boiler 21 and a gas turbine is running and the pressure in the flue gas channel 24 is positive, the dumper 52 that is openable only inward of the stack 15 can be kept open inward of the stack 15 so that the flue gas 12 can be drawn into the $CO_2$ recovering apparatus 22.

When the operation performed by an industrial facility such as the boiler 21 and a gas turbine positioned upstream of the stack 15, and the $CO_2$ recovering apparatus 22 is stopped for example, the inlet 36 can be closed with the damper 52. Thus, the atmosphere 17 can be prevented from flowing into an industrial facility such as the boiler 21 and a gas turbine.

Alternatively, the flue gas branch channel 40 through which the flue gas 12 is fed to the $CO_2$ recovering apparatus 22 may be provided in the flue gas channel 24. When the operation performed by an industrial facility such as the boiler 21 and a gas turbine is stopped, while the $CO_2$ recovering apparatus 22 is running, the flue gas 12 remaining in the flue gas channel 24 may be led out of the flue gas branch channel 40, and fed to the $CO_2$ recovering apparatus 22. When an industrial facility such as the boiler 21 and a gas turbine is running while an apparatus such as the $CO_2$ recovering apparatus 22 is not operated, the flue gas 12 in the flue gas channel 24 may be led out of the flue gas branch channel 40, and when the $CO_2$ recovering apparatus 22 starts running, the flue gas 12 may be fed to the $CO_2$ recovering apparatus 22. When the operation performed by an industrial facility such as the boiler 21 and a gas turbine, and the $CO_2$ recovering apparatus 22 is stopped, the flue gas 12 may be led out of the flue gas branch channel 40, and fed to the $CO_2$ recovering apparatus 22 when the $CO_2$ recovering apparatus 22 starts running.

Although, in the sixth air pollution control apparatus 10F according to the present embodiment, only the dumper 52 openable only inward of the stack 15 is provided as a opening/closing unit at the inlet 36 of the stack 15, the present invention is not limited to this configuration. For example, at least any one of the channel forming unit 23A of the first air pollution control apparatus 10A according to the first embodiment shown in FIG. 1, the channel forming unit 10B of the second air pollution control apparatus 23B according to the second embodiment shown in FIG. 3, the channel forming unit 23C of the third air pollution control apparatus 10C according to the third embodiment shown in FIG. 4, the mixing unit 41 of the fourth air pollution control apparatus 10D according to the fourth embodiment shown in FIG. 5, and the resistive part 51 of the fifth air pollution control apparatus 10E according to the fifth embodiment shown in FIG. 7 may be used in combination.

Although the present invention is explained as being used in an air pollution control apparatus including the $CO_2$ recovering apparatus 22, it may be used in an air pollution control apparatus including another apparatus such as a fuel gas desulfurization apparatus other than the $CO_2$ recovering apparatus 22.

According to an air pollution control apparatus of an embodiment of the present invention, without a blocking unit such as a damper, a stack includes a controlling unit that suppresses release of the flue gas outside from the stack and suppresses inflow of atmosphere to the stack, and the controlling unit is a channel forming unit that forms a serpentine channel through which the flue gas and the atmosphere in the stack flow. Even when the operation performed by an apparatus such as the $CO_2$ recovering apparatus is stopped for example, inflow of the atmosphere to the stack can be decreased, almost all amount of the flue gas discharged from the stack to the outside can be drawn into the $CO_2$ recovering apparatus stably and safely with a simple structure, and draw-in of the atmosphere to the $CO_2$ recovering apparatus or the like can be suppressed.

According to an air pollution control apparatus of an embodiment of the present invention, a stack includes a controlling unit that suppresses release of the flue gas outside from the stack and suppresses inflow of atmosphere to the stack, and the controlling unit is a mixing unit that mixes the flue gas and the atmosphere. Therefore, even when a device such as the $CO_2$ recovering apparatus stops running, inflow of the atmosphere into the stack is reduced. Almost all of the flue gas discharged from the stack is draw to the $CO_2$ recovering apparatus side stably and safely by a simple configuration of the apparatus. Also, a drawn-in of the atmosphere to the $CO_2$ recovering apparatus is suppressed.

According to an air pollution control apparatus of an embodiment of the present invention, a stack includes a controlling unit that suppresses release of the flue gas outside from the stack and suppresses inflow of atmosphere to the stack, and the controlling unit is a leak suppressing unit that suppresses inflow of the atmosphere to the stack. Therefore, even when a device such as the $CO_2$ recovering apparatus stops running, inflow of the atmosphere into the stack is reduced. Almost all of the flue gas discharged from the stack is draw to the $CO_2$ recovering apparatus side stably and safely by a simple configuration of the apparatus. Also, a drawn-in of the atmosphere to the $CO_2$ recovering apparatus is suppressed.

According to an air pollution control apparatus of an embodiment of the present invention, a stack includes a controlling unit that suppresses release of the flue gas outside from the stack and suppresses inflow of atmosphere to the stack, and the controlling unit is an opening/closing unit that is provided at an inlet of the stack through which the flue gas is fed into the stack and that is openable only inward of the stack. Therefore, when the $CO_2$ recovering apparatus is running, and the blower is drawing in the flue gas, and when an industrial facility such as a boiler and a gas turbine is running, and the pressure in the flue gas channel is positive, the opening/closing unit can be kept open inward of a stack. Thus, the flue gas can be drawn into the $CO_2$ recovering apparatus. When the operation performed by an apparatus such as the $CO_2$ recovering apparatus is stopped for example, the inlet can be closed with the opening/closing unit. Thus, the atmosphere can be prevented from flowing into an industrial facility such as the boiler and a gas turbine.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An air pollution control apparatus comprising: a stack that discharges flue gas, discharged from an industrial facility, outside; a blower that is provided downstream of the stack and draws in the flue gas; and a $CO_2$ recovering apparatus that recovers $CO_2$ in the flue gas drawn in by the blower, wherein the stack includes a controlling unit that suppresses release of the flue gas outside from the stack and suppresses inflow of atmosphere to the stack, and the controlling unit is a static mixer that mixes the flue gas and the atmosphere.

2. The air pollution control apparatus according to claim 1, further comprising a flue gas return flow channel that returns, into the stack, a part of the flue gas fed to the $CO_2$ recovering apparatus by the blower.

3. An air pollution control method using the air pollution control apparatus according to claim 1, comprising using a density difference between flue gas discharged from the industrial facility and atmosphere flowing in from outside of the stack, the density difference being caused by a temperature difference therebetween, to prevent the flue gas from flowing outside.

4. An air pollution control method using the air pollution control apparatus according to claim 1, comprising mixing flue gas discharged from the industrial facility and atmosphere flowing in from outside of the stack to prevent the atmosphere from flowing further inside of the stack.

5. An air pollution control method according to claim 4, comprising using the air pollution control apparatus to prevent the flue gas from flowing outside of the stack.

* * * * *